United States Patent [19]
Luening et al.

[11] Patent Number: 5,261,987
[45] Date of Patent: Nov. 16, 1993

[54] METHOD OF MAKING AN IDENTIFICATION CARD

[75] Inventors: James W. Luening, Rochester; Junneck Wisniewski, Pittsford, both of N.Y.

[73] Assignee: Eastman Kodak Company, Rochester, N.Y.

[21] Appl. No.: 894,679

[22] Filed: Jun. 5, 1992

[51] Int. Cl.$^5$ .............................. B32B 31/00
[52] U.S. Cl. .................... 156/235; 156/247; 156/277; 156/290; 283/77; 283/78; 283/109; 283/111; 283/112; 40/630
[58] Field of Search .............. 156/230, 235, 247, 277, 156/290, 344; 283/75, 77, 78, 107, 109, 111, 112; 40/625, 630

[56] References Cited

U.S. PATENT DOCUMENTS

| | | |
|---|---|---|
| 4,006,050 | 2/1977 | Hurst et al. |
| 4,096,015 | 6/1978 | Kawamata et al. |
| 4,287,285 | 9/1981 | Mosehauer |
| 4,313,984 | 2/1982 | Moraw et al. |
| 4,318,554 | 3/1982 | Anderson et al. ............. 156/290 |
| 4,322,461 | 5/1982 | Raphael et al. ............... 156/235 |
| 4,383,878 | 5/1983 | Young et al. .................. 156/235 |
| 4,441,945 | 4/1984 | Moraw et al. |
| 4,456,667 | 6/1984 | Bochow et al. |
| 4,464,448 | 8/1984 | Rothfjell |
| 4,464,454 | 8/1984 | Vogt |
| 4,507,349 | 3/1985 | Fromson et al. |
| 4,520,063 | 5/1985 | Simon et al. |
| 4,544,184 | 10/1985 | Freund et al. |
| 4,544,590 | 10/1985 | Egan |
| 4,560,426 | 12/1985 | Moraw et al. |
| 4,597,814 | 7/1986 | Colgate, Jr. |
| 4,680,460 | 7/1987 | Drexler |
| 4,713,365 | 12/1987 | Harrison |
| 4,738,949 | 4/1988 | Sethi et al. |
| 4,808,509 | 2/1989 | Vervloet et al. |
| 4,869,941 | 9/1989 | Ohki |
| 4,930,814 | 6/1990 | Nusmeier |
| 4,938,830 | 7/1990 | Cannistra |
| 4,977,061 | 12/1990 | Suganuma |
| 4,992,130 | 2/1991 | Vermeulen et al. |
| 4,999,065 | 3/1991 | Wilfert |
| 5,005,872 | 4/1991 | Lass et al. |
| 5,011,570 | 4/1991 | Ohbayashi |
| 5,021,318 | 6/1991 | Mayo et al. |
| 5,058,926 | 10/1991 | Drower |

FOREIGN PATENT DOCUMENTS

| | | | |
|---|---|---|---|
| 0442762 | 8/1991 | European Pat. Off. | 283/74 |
| 1400998 | 7/1975 | United Kingdom | 156/277 |

Primary Examiner—David A. Simmons
Assistant Examiner—Mark A. Osele
Attorney, Agent, or Firm—Milton S. Sales

[57] ABSTRACT

A high-security identification card produced by thermal printing personalized data on a transparent image receiver sheet and laminating the image-bearing surface of the receiver sheet to an opaque card support optionally bearing background printing. During thermal printing of the personalized data, the receiver sheet is supported by a carrier sheet adhered to one side thereof. The carrier sheet is removed prior to lamination by mildly fusing the personalized data bearing surface of the receiver sheet to the pre-printed background information bearing surface of the identification card and mechanically flexing the sandwiched structure to cause the relatively inflexible carrier sheet to break free, at least in part, from the receiver sheet to enable its removal. After removal of the carrier sheet, the sandwiched structure is laminated by heat and pressure applied thereto to cause it to fuse permanently. Preferably, the identification card is itself a composite of an inner opaque or reflective plastic sheet on which the background information may be printed by conventional printing techniques and transparent overlying sheets laminated thereto. Alternatively, the inner sheet may be blank and the out transparent sheets may be thermally printed with the background and adhered to in the same fashion to create a composite, pre-printed blank identification card.

6 Claims, 1 Drawing Sheet

METHOD OF MAKING AN IDENTIFICATION CARD

BACKGROUND OF THE INVENTION

1. Background of the Invention

This invention relates to a method of producing high-security, monolithic identification (ID) cards and cards made by the method.

2. Description of the Prior Art

The use of ID cards is growing in importance all over the world for use as driving licenses, financial transactions or bank cards, national ID cards, student cards, passports, security clearance cards, etc. Considering the ease by which some cards can be made, there is a need for a high-security card made using advanced technology which cannot be tampered with or forged.

There are usually two types of "printing" on ID cards. The first type of printing involves a "background" printing made up of reference and security information. The reference information may include, for example, the issuing agency, as well as other numerical data. The security information may be in the form of a watermark, an encoded magnetic strip, numerical sequences, a holographic image, etc. The second type of printing is made up of "personalized" information, such as a photographic, fingerprint, signature, name, address, etc.

One of the systems currently available makes use of a sequential or simultaneous multiple photographic exposure of both the background and personalized information by using conventional photography. There are problems with this system in that it is a wet process, it involves centralized processing so that the card is not available "instantly", and it is not a high-security system, since ordinary photography is used and such materials and skills are easily duplicated.

Another available system involves printing the background information either before or after a photograph is affixed. There are problems with this system also. If a photograph is laminated onto the surface of the ID card, then it can be altered by merely replacing the photograph. If the photograph is part of the card stock itself, then the printing of the background information is difficult since it is hard to print over the photographic gelatin surface of the card stock. Also, if a mistake is made in the printing, then the photograph has to be retaken. In addition, the system is a wet process and ia not available "instantly".

Another available system of the type described in U.S. Pat. No. 4,808,509 by Vervloet, et al, involves printing the background information on a paper support, using the diffusion transfer method to obtain the personalized information such as a photograph on another support, and then transferring the photograph onto the paper support. There are the same problems of alteration and wet processing with this system as described above.

Another available system uses conventional lithographic printing of background information on paper, followed by an electrophotographic process to obtain the personalized information or photograph. The photographs obtained by this system are usually black-and-white, however, are not continuous tone and are generally of poor quality.

A further system disclosed in U.S. Pat. No. 4,999,065 to Wilfert, incorporated herein by reference in its entirety, employs a data scanner and video camera coupled to a computerized image formatting system to operate a laser printer to print personalized and background information bearing ID cards. The paper image receiver is laminated between polyester sheets under heat and pressure in the conventional manner.

In recent years, thermal transfer system have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor is placed face-to-face with a dye-receiver. The two are then inserted between a thermal printing head and platen roller. A line-type thermal printing head is used to apply heat from the back of the dye-donor. The thermal printing head has many heating elements and is heated up sequentially in response to the cyan, magenta and yellow data print signals. The process is then repeated for the other two colors. A color image copy is thus obtained which corresponds to the original picture viewed on a screen. Further details of this process and an apparatus for carrying it out are contained in U.S. Pat. No. 4,621,271 by Brownstein, the disclosure of which is hereby incorporated by reference.

The use of the above process to produce ID cards is described in commonly assigned U.S. Pat. No. 4,738,949 by Sethi et al and U.S. Pat. No. 4,713,365 by Harrison, the disclosures of which are hereby incorporated by reference. The '949 patent discloses a high security identification card obtained by thermal dye-transfer of the personalized information, such as a photograph, signature and vital statistics on an image receiver which was previously printed with background information and thereafter laminating the image-bearing surface with a transparent laminate employing the adhesives disclosed in the '365 patent. The background information includes fine-line indicia. After lamination, it was found that attempts to delaminate or peal the double laminated composite apart caused the thermally-transferred dye image to be lifted off the polycarbonate dye-receiver layer by virtue of the strong adhesion provided by the adhesives disclosed in the '365 patent.

Various exemplary compositions are set forth in the '949 and '365 patents for the thermal-transfer dye donors, dye receivers, laminates and adhesives. As described therein, the dye receiving element of the ID card described in the '949 and '365 patents comprises a support having a dye image-receiving layer thereon which is pre-printed with fine lines. In the preferred embodiment, a polycarbonate dye image-receiving layer is employed that is coated onto a support sheet preferably polyester with a white pigment incorporated therein. The reflective support sheet and the overlying, thermally dye-transfer image bearing polycarbonate sheet are laminated between polyvinyl chloride (PVC) sheets, using the adhesives disclosed in the '365 patent.

The lamination of the support sheet between PVC sheets using such adhesives and heat and pressure is satisfactory in producing an ID card where the personalized and background information are both printed on the same polycarbonate surface and the information is to be viewed against the opaque background provided by the support sheet. However, the incorporation of the support sheet into the card renders the card susceptible to being de-laminated and altered.

It is thus desirable to increase tamper resistance by pre-printing the background information on card stock, e.g., PVC sheet material and separately print the personalized information on the exposed surface of the polycarbonate receiver sheet, which is adhered to a polyester or paper support during thermal dye-transfer printing. When the personalized image bearing surface is adhered to the PVC sheet stock, the paper support sheet must be removed so that the background and personalized information may be seen. It is undesirable to directly expose the paper support sheet to the heat and pressure of the laminating equipment, for it will become even more firmly attached to the polycarbonate sheet. On the other hand, the paper sheet must be firmly attached to the polycarbonate layer in order to support it during thermal dye-transfer printing.

SUMMARY OF THE INVENTION

It is thus an object of the present invention to simplify the method of making a tamper resistant ID card which is formed of two or more laminated sheets of thermal and pressure responsive plastic material.

It is a further object of the present invention to provide an improved method of producing a high-security ID card by thermal dye-transfer imaging of personalized information where the background information is pre-printed on background information sheet stock and the personalized information is printed on thermally transferred image receiver sheet which are subsequently laminated together.

In accordance with the present invention, a method is provided for laminating together a background plastic ID card stock with a personalized information bearing receiver sheet comprising the steps of lightly fusing the image-bearing surfaces of the receiver sheet with the surface of the ID card stock to create a sandwiched assembly, flexing the sandwich assembly to loosen the support layer of the information bearing receiver sheet, removing the loosened support layer from the sandwich assembly, and laminating the information bearing sheet with the ID card stock to create a unitary ID card structure.

In accordance with the preferred embodiment of the present invention, the card stock comprises an opaque polyvinyl chloride inner layer with transparent polyvinyl chloride outer layers on each surface of the inner layer and wherein the background information is pre-printed at the interface of the transparent and opaque polyvinyl chloride layers employing any conventional printing technique, including thermal dye-transfer printing. Preferably, the personalized information on the information bearing sheet is printed by conventional printing techniques, including thermal dye-transfer printing.

In accordance with a further preferred embodiment of the present invention, lamination may be effected by completely fusing the lightly fused sandwich assembly under heat and pressure employing an embossing plate which imparts a texture or relief pattern in the outer surfaces of one or both of the outer layers which provides additional security against tampering.

Cards manufactured in this fashion advantageously do not include a paper layer and are inherently more durable and less susceptible to de-lamination and tampering. The thermal dye images and information are welded into the interface of the fused together PVC and polycarbonate sheets and is therefore damaged if delamination is attempted. Since the thermal dye-transfer image and information bearing polycarbonate sheet is very thin, it can be laminated to somewhat thicker PVC sheets containing integrated circuits and still maintain compliance with industry standards.

BRIEF DESCRIPTION OF THE DRAWINGS

These and other objects, features and advantages of the present invention will become apparent to those skilled in the art from the following detailed description of the preferred embodiments thereof in conjunction with the drawings in which.

DESCRIPTION OF THE PREFERRED EMBODIMENTS

Figure 1:
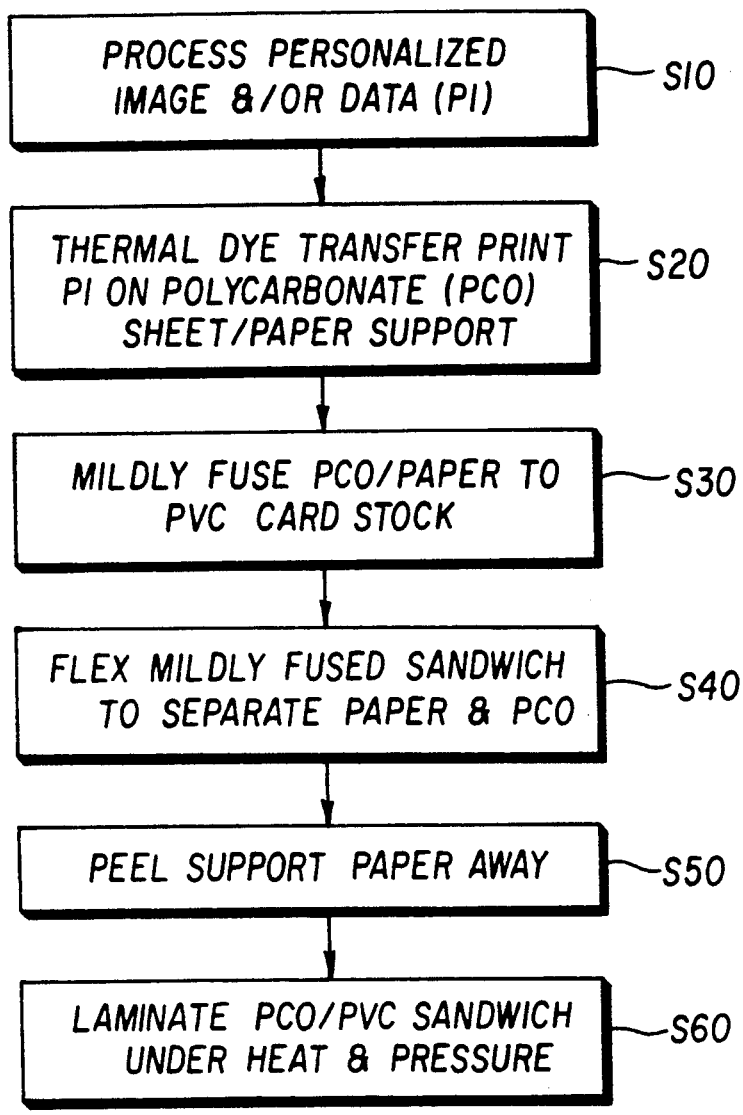
FIG. 1 illustrates the first embodiment of the method of the present invention.

The above-incorporated '365 and '949 patents describe the materials that may be used in the method of making the ID card of the present invention, including the dye donor transfer sheets, the dye-receiver sheet and the laminates employed in the practice of the present invention. Thermal printing heads which can be used to transfer dye from the dye-donor elements employed in the invention are available commercially, including those identified in the incorporated '949 and '365 patents. In general, it is contemplated that the background information may include the indicia identified in the '949 patent and the personalized data would include a photograph, signature, name, vital statistics and even a fingerprint all reproduced employing a Charge Coupled Device (CCD) scanner for the signature and fingerprint, a video camera to capture an image of the person's face and data entered by a keyboard operator into a computer based system for digitizing such images and text and formatting the digitized image and text data to control the operation of a thermal printer so as to print the personalized information in the required locations on the dye-transfer receiver. Software for providing such digitized images are already known and are produced by a number of companies including Interleaf Inc. of Cambridge, Mass., and as the Masscomp 500 Computer Program produced by Rise Technology Inc., Kendal Square, Cambridge, Mass.

In a typical system of the type depicted in the above-incorporated '065 patent, the formatted personalized information for printing may be produced by a scanning CCD array to read the personal signature, fingerprint or other information and a video camera for capturing an image of the person's face that is inputted to an image processor. The personalized information is processed by the image processor and fed to a display terminal provided with known controls to crop, reduce or enlarge the visual images and place them in any desired position on the screen.

In the present invention the personalized information is preferably applied to a three color thermal printer. In such a system for large scale production of ID cards, the scanned images and data are formatted by the computer to be placed in precise locations on the dye-transfer receiver sheet. When the image bearing receiver sheet is laminated with the pre-printed background information-bearing card, the personalized information lines up appropriately with the background information. Step S10 in FIG. 1 summarizes this process.

In accordance with the present invention, the personalized information is printed on one surface of a polycarbonate image receiver sheet, the other surface of which is adhered to a paper backing carrier sheet which provides support for the relatively thin polycarbonate layer as it is passed through the thermal printer for each dye color image transfer. This step in the process is summarized in block S20 of FIG. 1.

The image-bearing surface of the polycarbonate receiver is intended to be laminated to a blank ID card bearing standardized background information of the type described above. The PVC ID card blank is itself preferably opaque, and it is thus necessary to remove the paper support layer in order to use the card. As described above, the removal of the support layer becomes difficult after lamination of the personalized information image bearing sheet to the PVC card blank.

In accordance with the present invention, the paper support layer is removed by first lightly fusing the image-bearing surface of the polycarbonate receiver to the blank PVC card in the appropriate orientation to properly align the personalized information with the background information as summarized in step S30 of FIG. 1.

Such light fusing to create a bond of low bond strength may be accomplished by a hand or solenoid operated press having a removable tray in which the trimmed PVC card and the trimmed, personalized information bearing polycarbonate sheet may be placed so that the paper support is on the outside of the sandwiched sheet and card. A platen is either manually or through the action of an energized solenoid brought to bear against one of the exposed surfaces of the sandwich so that heat and pressure are applied for a certain time period. The platen is then withdrawn, and the lightly fused sandwich is withdrawn from the tray.

Preferably, only a portion of the contacting card and sheet are temporarily fused in this manner. Thus, preferably only a raised peripheral outline or pattern on the platen makes contact and causes light fusion in the area of contact. For example, the edges of the sandwich may be fused, leaving the center separated, but allowing the subsequent flexing of the sandwich to remove the paper support.

In practice, it has been found that a temperature of about 300° F. with a pressure of about 10 to 25 ft.-lbs applied for about 7 seconds is sufficient to achieve sufficient light fusion in the area of contact to allow flexion and removal of the paper support.

In the next step of the inventive method, summarized in step S40 of FIG. 1, the sandwiched-together polycarbonate-PVC ID card is flexed by squeezing the ends of the rectangular card toward one another and causing the card to bend and the paper to break loose from the other surface of the polycarbonate receiver, whereupon the paper may be grasped and entirely removed by peeling it away (summarized in Step S50 of FIG. 1). Thereafter, the lightly fused sandwich assembly is passed through a laminating press which applies heat and pressure to completely laminate the sandwiched layers together as summarized in step S60 of FIG. 1. These steps may be performed automatically by sheet feeding equipment for the fabrication of ID cards or by hand.

Figure 2:
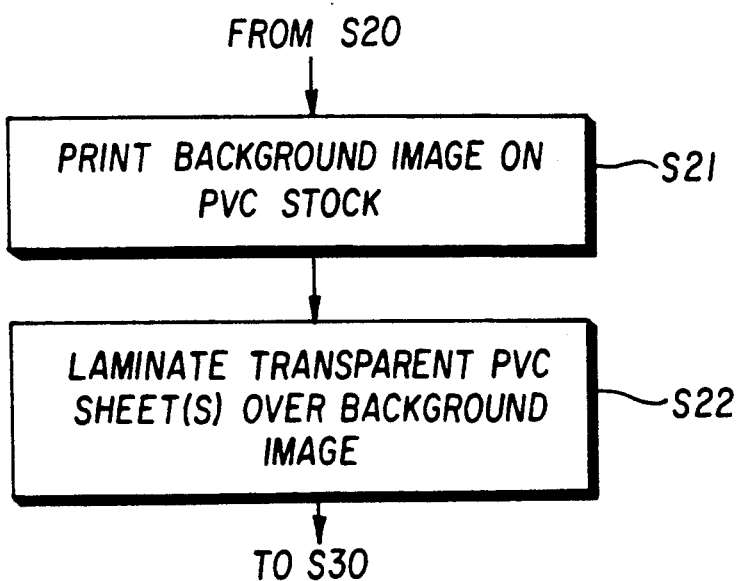
FIG. 2 sets forth a second embodiment of the method of making an identification card in accordance with the present invention.

The background information-bearing polyvinyl chloride ID card stock may be fabricated of a single opaque layer of PVC sheet stock on which the background indicia may be imprinted in any known manner. The printed PVC sheet may thereafter be laminated between transparent PVC sheets to protect the printing from the adhesion of the dye-transfer color image on the polycarbonate receiver sheet on one side and from wear on the other side. It is also possible to print the background information by thermal dye-transfer printing on the transparent PVC protective layer sheets and laminating the image-bearing surfaces of the transparent PVC sheets to the opaque PVC sheet stock. FIG. 2 summarizes these operations as steps S21 and S22 which would take place between steps S20 and S30 of FIG. 1.

The invention has been described in detail with particular reference to certain preferred embodiments thereof, but it will be understood that variations and modifications can be effected within the spirit and scope of the invention.

What is claimed is:

1. A method of making an identification card with background and personalized information printed therein comprising the steps of:

printing personalized information on the exposed surface of a receiver sheet which is adhered to a support sheet on its opposite surface;

lightly fusing the exposed surface of the receiver sheet to a surface of a further sheet of plastic material to create a bond of low bond strength to temporarily sandwich the receiver sheet between the support sheet and the further sheet surface;

flexing the lightly fused together sandwich sufficiently to cause the adhesion of the support sheet to the receiver sheet to loosen;

removing the loosened support sheet; and subjecting the remaining sandwiched together sheets to heat and pressure to effect further fusing for complete lamination of the receiver sheet to the further sheet material.

2. The method of claim 1 wherein the material of said receiver sheet is a polycarbonate and the material of said further sheet of plastic material is a polyvinyl chloride.

3. A method of making an identification card with background and personalized information printed therein comprising the steps of:

printing background information on one or both surfaces of a sheet of laminable material;

thermal dye-transfer printing multi-color personalized information on the exposed surface of a dye-transfer receiver sheet which is adhered to a support sheet on its opposite surface;

lightly fusing the exposed surface of the dye-transfer receiver sheet to one surface of the laminable sheet material to create a bond of low bond strength to temporarily sandwich the dye-transfer receiver sheet between the support sheet and the laminable sheet;

flexing the lightly fused together sandwich sufficiently to cause the adhesion of the support sheet to the dye-transfer receiver sheet to loosen;

removing the loosened support sheet; and subjecting the remaining sandwiched together sheets to heat and pressure to effect further fusing for complete lamination of the dye-transfer receiver sheet to the laminable sheet.

4. The method of claim 3 wherein the material of said dye-transfer receiver sheet is a polycarbonate and the material of said sheet of laminable material is an opaque polyvinyl chloride.

5. The method of claim 3 further comprising the steps of:

laminating said sheet of laminable material between first and second laminate sheets of transparent thermoplastic material to provide a composite card stock so that background information is protected but can be viewed through the laminate sheets.

6. The method of claim 5 wherein the material of said dye-transfer receiver sheet is a polycarbonate, the material of said sheet of laminable material is an opaque polyvinyl chloride and the material of said laminate sheets are transparent polyvinyl chloride.

* * * * *